W. T. SNEDDEN.
GEARLESS DIFFERENTIAL.
APPLICATION FILED MAR. 13, 1917.
1,300,500.
Patented Apr. 15, 1919.
2 SHEETS—SHEET 2.
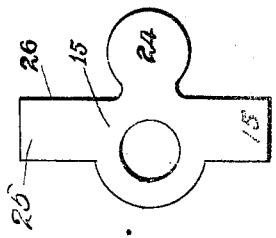
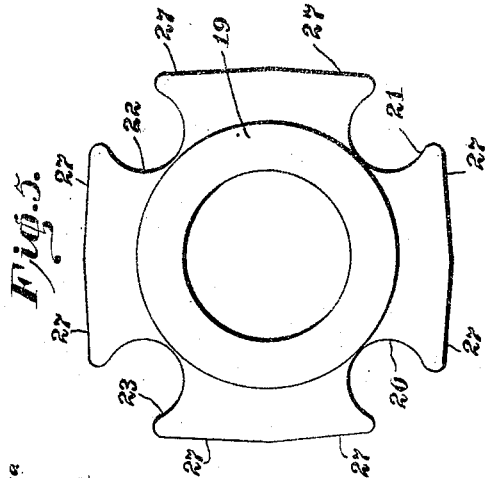
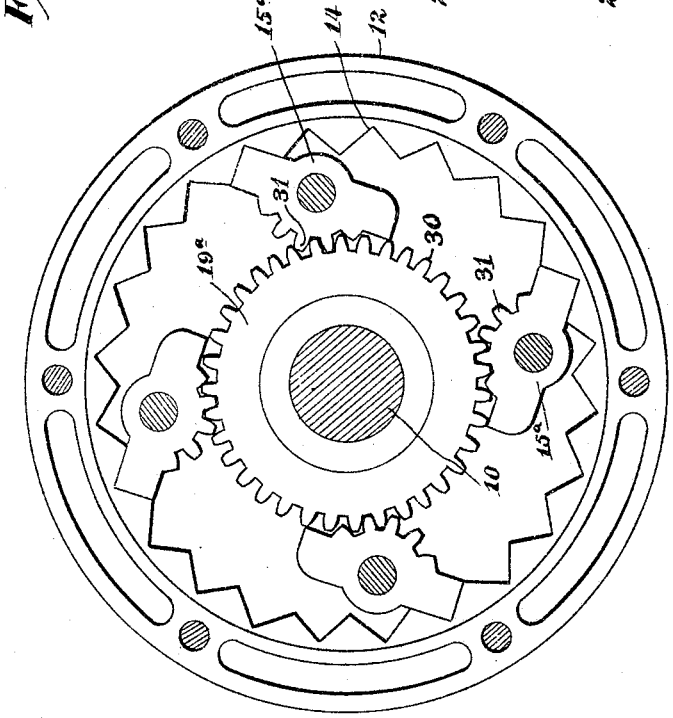
Inventor
William T. Snedden,
By Knight Bros
Attorneys.

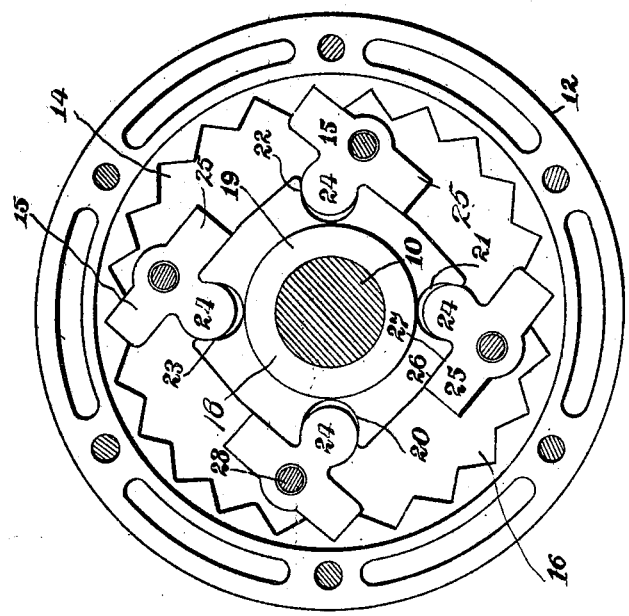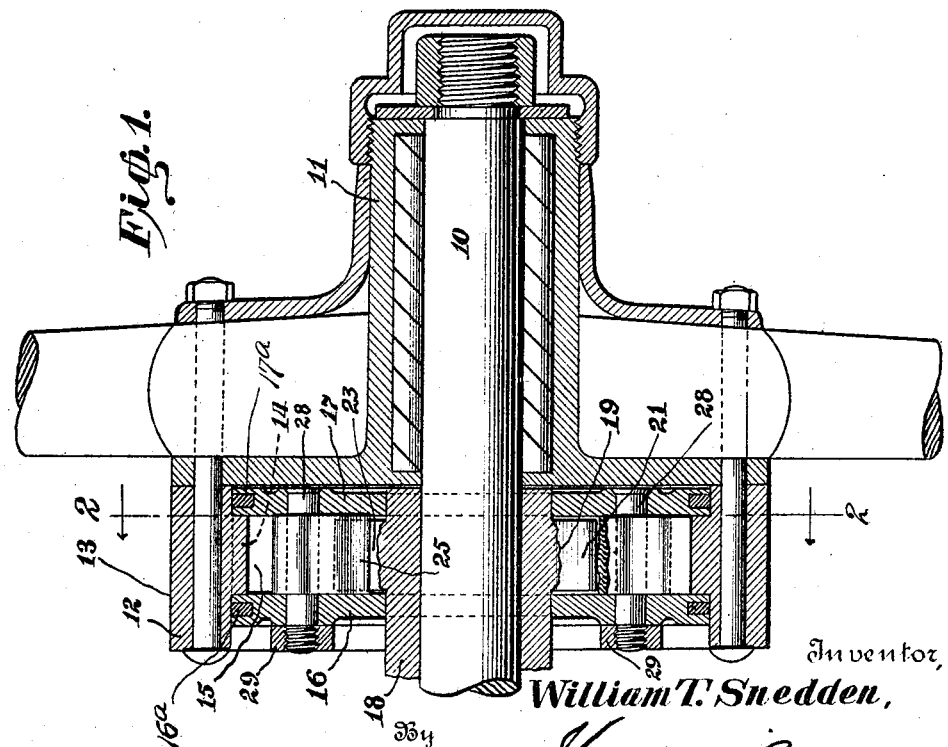

UNITED STATES PATENT OFFICE.

WILLIAM TAIT SNEDDEN, OF KANSAS CITY, MISSOURI.

GEARLESS DIFFERENTIAL.

1,300,500.   Specification of Letters Patent.   Patented Apr. 15, 1919.

Application filed March 13, 1917. Serial No. 154,491.

*To all whom it may concern:*

Be it known that I, WILLIAM T. SNEDDEN, a citizen of the United States, residing at Kansas City, in the county of Jackson and State of Missouri, have invented certain new and useful Improvements in Gearless Differentials, of which the following is a specification.

This invention relates to a gearless differential, particularly adapted for use in connection with motor vehicles and the like, and one of the objects of the invention is to provide a simple, durable and efficient device of the class described which will well perform the purpose for which it is intended.

In the drawings:—

Figure 1 is a vertical sectional view through a hub, to which my invention is applied;

Fig. 2 is a cross sectional view on the line 2—2 of Fig. 1;

Fig. 3 is an elevational view of a modified form of clutch connection;

Fig. 4 is a detail view of one of the pawls shown in Fig. 1, and

Fig. 5 is a detail view of the pawl actuating head.

Referring now to Figs. 1 and 2, 10 designates the axle on which is rotatably mounted a wheel 11 of any preferred construction. The wheel 11 is shown as having bolted or otherwise secured thereto a circumferential flange or drum 12 which has an outer surface 13 adapted to be employed as a brake drum, and provided on its interior with a plurality of circumferentially arranged notches or recesses 14 to receive the squared ends of the pawls 15 pivoted between the parallel collars 16 and 17 interposed between the drum 12 and the driving sleeve 18 upon the axle 10. The driving sleeve has integral therewith a pawl actuating head 19 here shown as substantially rectangular in plan, but provided with corner recesses or notches 20, 21, 22 and 23 respectively, to receive the head engaging portions 24 on the pawls 15. Collars 16 and 17 are independent, as to rotation, of the sleeve 18 and drum 13, except that each collar is provided with a friction ring 16ª and 17ª respectively, which rings bear with suitable friction against drum 13 to suitably retard the partial rotation of the disks, required to move the pawls into the notches, as will be more fully explained presently.

By reference to Fig. 2, it will be observed that the pawls 15 are provided with rearwardly projecting portions 25, the inner edges 26 of which are adapted to lie flush with the slightly inclined edges 27 of the head 19, so that when the pawls are in the position shown in Fig. 2, a rotation of the head 19 from right to left will maintain them rigid with said head and in rigid engagement with the angular notches 14 in the drum 12.

By reference to Fig. 1, it will be observed that the pawls are held between the collars 16 and 17 by means of bolts 28 which are secured thereto by the nuts 29, whereby the collars 16 and the pawls may be readily accessible for inspection or repair.

From the foregoing description, it will be apparent that when the driving member or sleeve 18, which may be connected in any suitable manner with the power plant, is rotated from right to left, the pawls 15 will be tilted on their pivots 28 until their rear end 25 rests upon the head 19, as shown in Fig. 2. A continued rotation of the driving member 18 will cause the engaging ends of the pawls 15 to remain within the recesses 14 of the driven member or drum 12 rigidly attached to the wheel. If, however, it becomes necessary for the wheel to overrun the driving member, the inclined edges of the notches 14 will tilt the engaging ends of the pawls 15 inwardly so that said pawls will be out of engagement with the recesses 14, and a free overrunning movement of the driven member may take place. As soon as the driving member catches up with the driven member, however, the pawls will immediately engage the recesses 14 and direct driving will be resumed.

In Fig. 3 the clutch actuating head is in the form of a gear 19ª, provided with teeth 30 which engage similar teeth 31 on the pawls 15ª, the construction of the drum 12, the recesses 14 and the remainder of the structure being similar to that in Figs. 1 and 2.

Flange 33 is provided with a friction ring 33ª at its periphery similar to friction rings 16ª and 17ª in Fig. 1.

I claim:—

In a mechanism of the character described, a driving sleeve, a head fixed on said sleeve, a wheel, a brake drum fixed to said wheel and surrounding said sleeve, but spaced therefrom and having internal pawl engaging recesses, disks rotatably mounted on said sleeve, having friction rings on their periphery engaging said drum, and pawls mounted on said disks between the head and the drum and actuated by said head to engage said drum recesses.

The foregoing specification signed this 13th day of Feby, 1917.

WILLIAM TAIT SNEDDEN.